Patented Sept. 17, 1935

2,014,503

UNITED STATES PATENT OFFICE 2,014,503

MINERAL FILTERING SUBSTANCE

Perley G. Nutting, Washington, D. C.

No Drawing. Application August 31, 1934,
Serial No. 742,353

7 Claims. (Cl. 252—2)

This invention relates to a method of revivifying or activating mineral substances for use as filtering agents and of re-activating spent mineral filtering agents, and is particularly useful in restoring agents used as filtering, bleaching, decolorizing and deodorizing media for oils, fats, waxes, gums, fruit juices, sugars and the like to the original degree of activation.

The invention always comprehends the products resulting from treating a mineral filtering agent in the manner hereinafter described, inasmuch as my process is effective in many instances to revivify a spent agent to more than its original degree of activation.

This application is a continuation in part of my original application Serial No. 526,543 dated March 30, 1931, and entitled "Mineral filtering substances". In said original application I described several novel methods of preparing desirable mineral filtering substances from both natural and synthetic materials, all of said methods having been developed as the result of extensive experiments which led to the discovery that filters of this class function through forces of selective adsorption existing between the darker and more active (usually basic) constituents of a fluid to be filtered and the chemically active (usually acid) surfaces of the filter material, the remaining fluid being thereby rendered less highly colored and chemically more stable. The filtering power of a selectively adsorbing filtering material thus apparently resides in the chemical condition of the filter surface and accordingly my invention in its broadest aspect resides in the production of suitable chemically active surfaces on natural or prepared minerals, which substances are thereby rendered selectively adsorbing with respect to fluids of the character above indicated.

The experiments which have led to the discovery forming the subject-matter of the present invention included a careful study of both natural and synthetic mineral filters as previously known, such as for example the (natural) fuller's earths and bentonites and (synthetic) silica gel and amorphous silicates. I have discovered that each of these classes of substances are characterized by combined water not removable by heating to the boiling point of water nor by desiccation, but which is removable only by heating to 150 to 350° C. This indicates that the water is adsorbed or combined as H and OH radicals. Heating and/or other means hereinafter described drives off these radicals in pairs as HOH or $H_2O$ thereby leaving surfaces characterized by what I choose to designate open bonds, which condition is evidenced by an inherent absorptive force which continues until existing external forces are balanced. In the presence of a vapor, the active surface of the filter first adsorbs H and OH radicals over its surface from the vapor. This thin initial layer is in the form of a liquid film which increases in thickness until its vapor pressure approaches that of the surrounding vapor at which the existing forces are in equilibrium. Similarly, in the presence of a solution the active surface of the filtering material adsorbs the substances (usually basic) in solution until the forces are balanced by the solution tension of the solvent.

The theory underlying the creation or production of chemically active surfaces characterized by open bonds is well illustrated in the case of silica gel as prepared by combining solutions of water glass and acid. Silica gel as thus prepared is considered to be in the form of long chains of molecules represented by $(H_2SiO_3)_n.H_2O$. From such chains $(n+1)H_2O$ radicals may be driven off by heating to elevated temperatures, thus creating open or unsatisfied bonds as previously stated. This unstable condition of bond equilibrium in the case of silica gel may be indicated thusly:

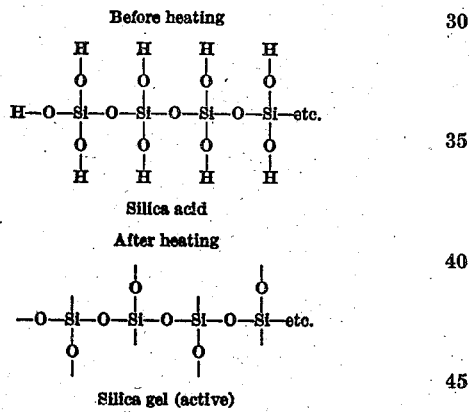

With the facts above in mind I have developed several processes by which synthetic and/or natural mineral substances may be provided with chemically active surfaces characterized by a condition of unstable bond equilibrium or, as I choose to designate this condition, open bonds. Generally, the methods I have devised comprise introducing into the surface of the mineral to be activated ions or radicals volatilizable by heat or other simple means. In natural filters (fuller's earth and the like) such ions are already present. In the synthetic filters (such as silica gel) they are incident to the structure produced by the chemical reaction. By my invention there is rendered available for use as selectively adsorbing filtering substances a large number of natural and synthetic mineral substances which have heretofore been considered incapable of functioning in this manner.

One of the methods I developed for preparing activated mineral filters and which is referred to in my original application, is applicable to a restricted class of natural minerals, namely those having basic elements replaceable by H and OH ions of ordinary acids, in which alkali and alkaline earth elements are already present as an essential part of the molecular structure. Examples of such minerals are zeolites, vermiculites, basalt, olivines, glauconite, certain basic clays, decomposed granite and gneiss and serpentines. Acid treatment of such materials results in the replacement of the superficial basic elements of these minerals by hydrogen and hydroxyl ions. This class of minerals I find to be readily activated when in pulverized form, by partial leaching with an ordinary acid such as nitric, hydrochloric or sulphuric followed by thorough washing and then drying, preferably at a temperature of substantially 200° C.

My experiments in connection with the production of selectively adsorbing filtering media by this method have also resulted in the discovery of a novel means of revivifying or reactivating spent natural mineral filters such as Floridin fuller's earths and bentonites used in filtering mineral oils. I have found that such spent earth may be completely restored to better than its original condition by treating it with a solution of chromium trioxide (chromic acid).

The oxide of chromium used ($CrO_3$) in forming chromic acid is extremely soluble in water while the other oxides ($CrO$, $Cr_2O_3$ and $CrO_2$) are insoluble. The stronger solutions attack hydrocarbons (so called wet combustion) much more vigorously than those more dilute. For reactivating used clay I use a solution composed of about equal parts of water and oxide. On mixing such a solution with an equal volume of dry used clay, vigorous action starts in about one minute with generation of considerable heat as long as the reaction continues. If the reaction is so violent as to boil away water, a little cold water is added to restrain the reaction. To remove the last traces of hydrocarbon from the clay, the chromic acid solution is left on the clay at least ten hours or overnight in a warm place, preferably 40 to 70° C.

This treatment with chromic acid oxidizes the adsorbed tarry coating of hydrocarbon to $H_2O$ and $CO_2$, leaving the surface, after washing and desiccating at temperatures approximating 150 to 350° C., perfectly clean and fully as active as in its original raw state while the minute pores in the earth remain largely filled. Such revivified earth is better than the original raw earth in that while its surfaces are fully reactivated its retention of oil is much decreased. Restoring spent earth in this manner is thus very similar in principle to the activation of minerals containing inorganic bases, the difference being that in this case the adsorbed basic material is organic. In either case the basic ions are replaced by the H and OH ions and these latter are removed by desiccation, leaving open bonds.

By actual test, spent mineral filtering materials which have been restored or revivified by the above described method have proven to be more efficient filtering and decolorizing agents than originally. I attribute this to the fact that my process has not only removed the tarry constituents of the liquids being treated which are adsorbed by and adhere to the filtering agent, but the acid treatment followed by desiccation at high temperature has produced new active surfaces characterized by open bonds.

Having thus described my invention, what I claim as new is:

1. The process of producing an active filtering surface on spent earth comprising treating a used earth with an aqueous solution of chromic oxide followed by washing out the excess solution with water and desiccating at temperatures between 150° C. and 350° C.

2. The process of producing an active filtering surface on an earth having intimately mixed therewith organic basic material comprising oxidizing the organic basic material by contacting the mixture with chromic acid, then washing the mixture with water and desiccating the earth at a temperature between 150° C. and 350° C.

3. An active filtering agent comprising a suitable earth characterized by having its pores filled with the adsorbed constituents from a previous filtering operation, and its exposed surface activated by chromic acid treatment followed by desiccation at temperatures between 150° C. and 350° C.

4. The process of producing an active mineral filtering agent from an earth having organic constituents replaceable by H and OH ions comprising replacing said organic constituents with H and OH ions by treating said earth with chromic acid, washing the earth to free it of excess acid, and then drying the earth at temperatures between 150° C. and 350° C.

5. In the process of revivifying spent filtering materials employed in decoloring oils, syrups and the like, the step of contacting such filtering materials with chromic acid.

6. In the process of revivifying spent filtering materials employed in decolorizing oils, syrups and the like, the step of contacting such filtering materials with an aqueous solution of chromic oxide.

7. In the process of revivifying spent filtering materials employed in decolorizing oils, syrups and the like, the step of contacting such filtering materials with an aqueous solution of chromic oxide in the proportion of substantially 50 parts of water and 50 parts of $CrO_3$.

PERLEY G. NUTTING.